*G. Raymond,*
*Tool Handle,*

N° 80,565. Patented Aug 4, 1868.

Witnesses:
Daniel Cross.
Walter A. Eames.

Inventor:
Geo Raymond.

United States Patent Office.

GEORGE RAYMOND, OF FITCHBURG, MASSACHUSETTS, ASSIGNOR TO HIMSELF AND SAMUEL E. CROCKER.

Letters Patent No. 80,565, dated August 4, 1868.

IMPROVEMENT IN ATTACHING HANDLES TO TOOLS.

The Schedule referred to in these Letters Patent and making part of the same.

KNOW ALL MEN BY THESE PRESENTS:

That I, GEORGE RAYMOND, of Fitchburg, in the county of Worcester, and Commonwealth of Massachusetts, have invented certain new and useful Improvements in Connections for Securing the Handles to Forks, Hoes, and for other purposes; and I do hereby declare that the following is a full, clear, and exact description of the same, reference being had to the accompanying drawings, forming a part of this specification, in which—

Figure 1:
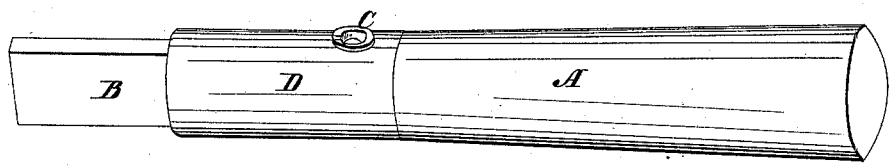
Figure 1 represents a perspective view of my improved connection when applied to unite the handle A with the tang or shank B.
Figure 2:
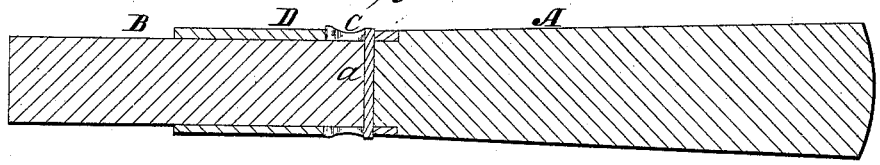
Figure 2 represents a longitudinal vertical central section through the parts shown in fig. 1.
Figure 3:
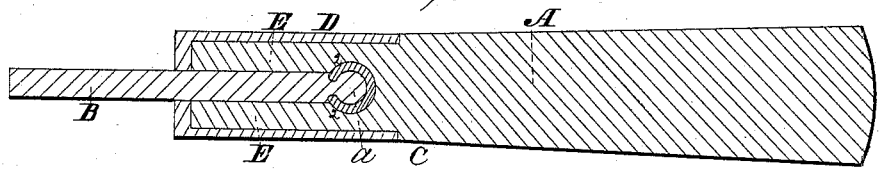
Figure 3 represents a longitudinal central section, the line of section being at right angles to that shown in fig. 2.

To enable those skilled in the art to which my invention belongs to make and use the same, I will proceed to describe it more in detail.

In the drawings, the handle A has a slot cut in one end, to receive the shank or tang B, the end, $a$, of the latter being made round, while grooves 1 1 are cut or otherwise formed in the sides of the shank or tang B, to receive the ends, 2 2, of the circular key C.

The end of the slot in the handle A is cut out large enough to receive the key C, after the shank or tang B has been inserted, as shown in the drawings.

The ferrule D has a hole cut through it, large enough to pass the key C.

The operation of uniting the handle of a fork or hoe, having a shank or tang made in the form shown in the drawings, is as follows:

The tang or shank is passed through an opening or slot in the front of the ferrule D, then into the slot in the handle B, the ferrule D being slipped into place upon the handle at the same time. After the ferrule and shank are both in place, the key C is driven down through the ferrule, and around the rounded part, $a$, of the shank or tang, as shown in the drawings, thereby locking all the parts securely together. The key C retains the shank or tang and ferrule both in place.

The tang can neither pull out nor twist around, while the ferrule D keeps the ends or forks E E from spreading, so that the key C remains closely clasped between the handle and the rounded part, $a$, of the tang or shank.

The end, $a$, of the shank B may be made of a different form, if preferred, with a key to correspond, and, in lieu of cutting a hole in the ferrule of the size of the key and end, $a$, of the tang or shank, the hole may be cut of the shape of the key only.

My improved connection, it will be noticed, is very simple, yet strong, and not liable to get out of order. Again, a common farm-laborer can very easily and quickly detach one handle and attach another, which is often desired.

The feature of my invention renders it peculiarly adapted for use for hand-tools in shops and other places.

It will be observed that the ferrule can be applied with as much ease as in cases when the shank or tang is driven into a tapering hole bored in the end of the handle.

The key C is made tapering, and the hole to receive it is also made tapering, so that, when the key is driven in, it binds handle, ferrule, and shank all securely together, and besides, the key is not liable to work loose or pull out when the article is in use, while the key can be quickly removed, when desired, to separate the parts, or to change handles, for convenience in shops and factories, or for repairing any of the parts.

Having described my improved connection for securing the handles to forks, hoes, and for other purposes, what I claim therein as new, and of my invention, and desire to secure by Letters Patent, is—

The combination, with the handle, its ferrule, and the tang or shank of the tool, of a tapering tubular key, passing through both the ferrule and handle, and encircling and grasping the end of said shank or tang, under the arrangement and for operation as herein shown and set forth.

GEO. RAYMOND.

Witnesses:
 DANIEL CROSS,
 WALTER A. EAMES.